United States Patent [19]

Hammarlund et al.

[11] Patent Number: 5,367,137

[45] Date of Patent: Nov. 22, 1994

[54] METHOD OF PRODUCING A PROTECTIVE GAS AND A GAS MIXTURE THEREFOR

[75] Inventors: Nils Hammarlund; Kjell-Arne Persson, both of Sollentuna; Ladislav Sipek, Täby, all of Sweden

[73] Assignee: AGA Aktiebolag, Lidingo, Sweden

[21] Appl. No.: 934,473

[22] PCT Filed: Feb. 21, 1991

[86] PCT No.: PCT/SE91/00133

§ 371 Date: Sep. 11, 1992

§ 102(e) Date: Sep. 11, 1992

[87] PCT Pub. No.: WO91/13720

PCT Pub. Date: Sep. 19, 1991

[30] Foreign Application Priority Data

Mar. 14, 1990 [SE] Sweden ............................ 9000916-8

[51] Int. Cl.⁵ .................................................. B23K 9/16
[52] U.S. Cl. ........................................ 219/74; 252/372
[58] Field of Search ................ 219/74, 75; 252/372

[56] References Cited

U.S. PATENT DOCUMENTS 3,526,740  9/1970  Brinkmann et al. ................ 219/74
4,292,493  9/1981  Selander et al. .

FOREIGN PATENT DOCUMENTS 0020174  12/1980  European Pat. Off. .
634498   2/1983   Switzerland .

*Primary Examiner*—Clifford C. Shaw
*Attorney, Agent, or Firm*—Calfee, Halter & Griswold

[57] ABSTRACT

The present invention relates to a method of producing a protective gas consisting of 0.0010–0.100 percent by volume nitric-oxide, 0–90 percent by volume helium, 0–5 percent by volume hydrogen, 0–50 percent by volume carbon dioxide, and the remainder argon. The invention also relates to a gas mixture for producing the productive gas. The method of producing the protective gas is characterized by dissolving nitric oxide in condensed argon to a concentration of 0.0010–0.100 percent by volume, calculated on gas phase, vaporizing the resultant solution and mixing remaining constituents in the vaporized solution in such proportions as to obtain a protective gas of the predetermined composition. The gas mixture used for producing the protective gas is characterized in that it consists of 0.0010–0.100 percent by volume nitric oxide in condensed argon, calculated on gas phase, and is preferably held under an overpressure.

11 Claims, 1 Drawing Sheet

× NO CONC. IN GAS PHASE    + NO CONC. IN LIQUID PHASE 5,367,137

METHOD OF PRODUCING A PROTECTIVE GAS AND A GAS MIXTURE THEREFOR

BACKGROUND OF THE INVENTION

The present invention relates to a method of producing a protective gas consisting of 0.0010–0.100 percent by volume of nitric oxide, 0–90 percent by volume helium, 0–5 percent by volume hydrogen, 0–50 percent by volume carbon dioxide and the remainder argon, and also to a condensed gas mixture for the production of said protective gas.

In electric gas-arc welding processes there is often used a protective gas in the form of a gas mixture consisting of or comprising argon and nitric oxide. The protective gas mixture or protective gas may also include carbon dioxide, helium and/or hydrogen. To large consumers of protective gases, these gases containing nitric oxide, there is at present delivered a gas pre-mixture, a master gas, consisting of a nitric oxide in argon under high pressure, this gas being delivered in conventional steel bottles. The proportion of nitric oxide present is normally from 1–5 percent by volume, for instance 1.8 percent by volume. The desired protective gas is then produced by mixing the various gases with the gas pre-mixture to the composition desired. The amount of nitric oxide present in the final protective gas is normally at most 0.030 percent by volume.

Since nitric oxide is a poisonous gas, it is desirable to use lower proportions of nitric oxide in the master gas than those used hitherto. This results in higher transportation costs, since it is necessary to transport to the consumer more gas bottles containing master gas at unchanged protective gas consumption.

Another drawback with the master gas is that when preparing a protective gas it is necessary to supply additional argon in order to reach the desired final concentration of argon in the protective gas produced.

OBJECTS OF THE INVENTION

Accordingly, one object of the present invention is to provide a condensed gas mixture of nitric oxide in argon with a lower proportion of nitric oxide than has hitherto been used in the master gas without increasing the transportation costs as a result hereof and without occasioning excessive switching between gas sources (nitric oxide containing gas).

Another object of the present invention is to provide a condensed gas mixture of nitric oxide and argon for the production of a protective gas which does not require the additional admixture of pure argon.

Still another object of the invention is to provide a gas mixture of nitric oxide and argon in liquid form in order to considerably reduce the number of gas-mixture deliveries to the consumer.

A further object of the invention is to provide a method for producing a protective gas which in addition to containing nitric oxide and argon also contains helium, carbon dioxide and/or hydrogen, by using simpler mixing apparatus.

SUMMARY OF THE INVENTION

These objects are achieved with a condensed gas mixture which comprises condensed argon in which 0.0010–0.100 percent by volume, calculated on gas phase, of nitric oxide is dissolved. Argon is a liquid between about −185.9 and −189.2 degrees Celsius at atmospheric pressure, whereas nitric oxide, NO, has a freezing point at about. −164 degrees Celsius.

It has now surprisingly been found that nitric oxide can be dissolved in liquid argon at atmospheric pressure in an amount of at least up to 0.1 percent by volume calculated on gas phase, and that the vaporized gas mixture has essentially the same composition as the liquid phase.

BRIEF DESCRIPTION OF THE DRAWING

The invention will now be described in more detail with reference to an exemplifying embodiment thereof illustrated in the accompanying drawing, the single FIGURE of which is a graph in which the nitric oxide concentration, in ppm, is plotted as a function of time during which removals of gas mixtures takes place.

DETAILED DESCRIPTION OF THE PREFERRED EMBODIMENT

Figure 1:
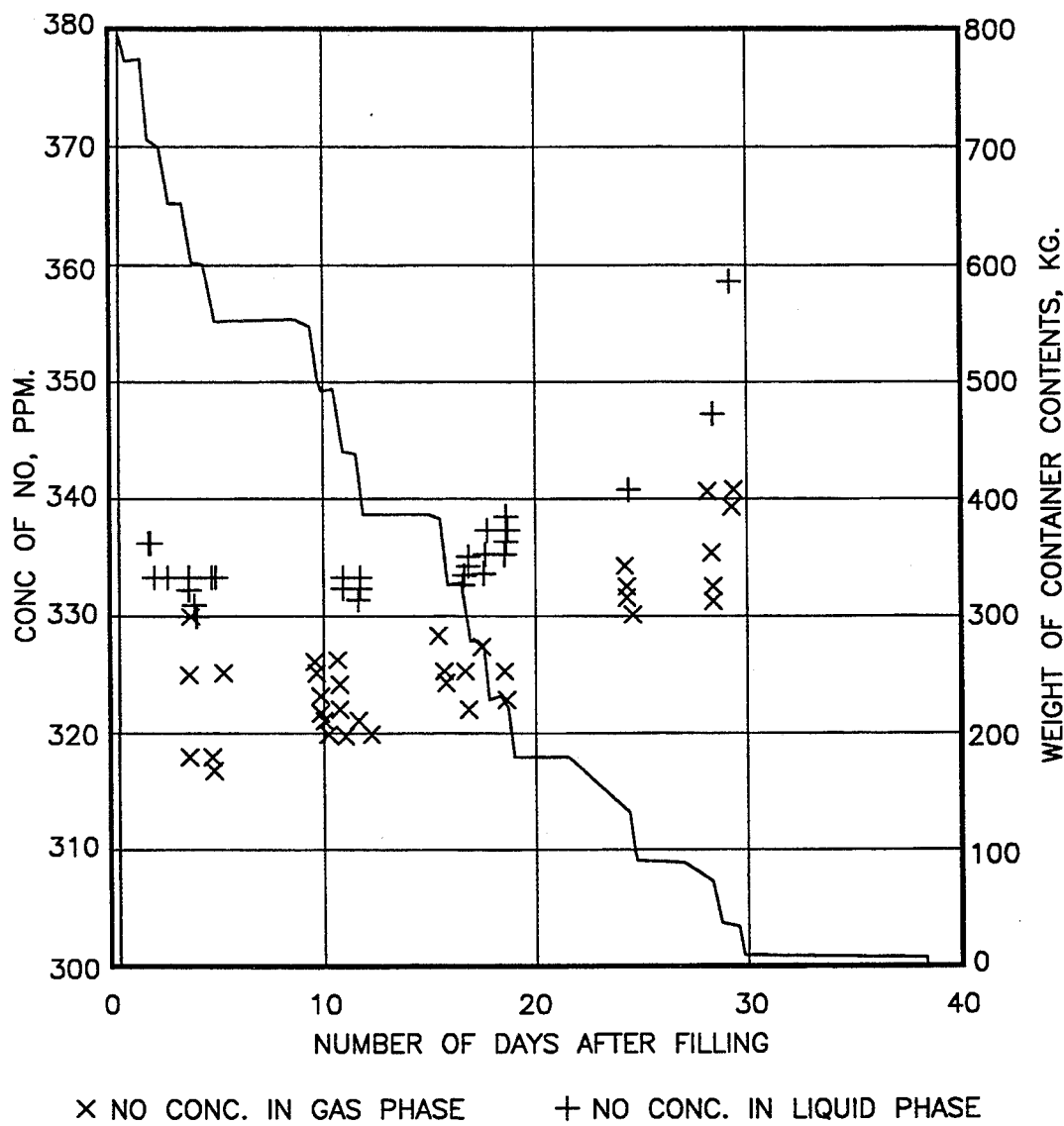

A pressure container which accommodates about 800 kg liquid argon was filled with liquid argon, whereafter nitric oxide was dissolved in the argon until the nitrogen monoxide concentration had risen to about 300 ppm. This dissolution can be achieved by dissolving in condensed argon a master gas consisting of nitric oxide in argon, e.g. 1.8 percent by volume NO in argon. 60 liters of the gas mixture were taken from the container each minute over a period of 8 hours in each working day. This gas outtake was intended to simulate the consumption of protective gas in a arc welding process. The weight of the gas mixture remaining in the container, both in liquid phase and gas phase, is given in the FIGURE. The experiment was continued for 30 calendar days. Samples of the composition of both the and liquid phases were continuously taken. The weight of the remaining gas mixture is plotted on the right-hand abscissa axis. The FIGURE also shows the concentrations of nitric oxide in argon as a function of time. The concentration of nitric oxide is plotted in ppm on the left-hand abscissa axis of the graph. It will be seen from the graph that the nitric oxide concentration in the gas phase is almost equal to the nitric oxide concentration in the liquid phase. Furthermore, it is evident that the concentrations in the two phases are substantially independent of time and of the amount of condensed gas mixture in the container. The container was fitted with a pressure safety valve which opened automatically when the pressure in the container had risen to 17.5 bars overpressure. The pressure varied between about 3 bars and 17.5 bars during the experimental period.

Thus, when producing a protective gas consisting solely of argon and nitric oxide, the predetermined quantity of nitric oxide can be dissolved in the liquid argon and then taken out either in vapor phase or liquid phase, it being necessary in this latter case to vaporize the mixture in liquid phase.

When producing a protective gas consisting of 300 ppm nitric oxide, 20 percent by volume carbon dioxide, 30 percent by volume helium and the remainder argon for instance, there is prepared a master gas which consists of 600 ppm nitric oxide in liquid argon. This mixture, which constitutes 50 percent by volume of the protective gas, is then mixed with 20 percent by volume carbon dioxide and 30 percent by volume helium. This requires the use of a gas mixer which has three inputs. On the other hand, when working on the basis of a known gas mixture of nitric oxide in argon in gas form with a nitric oxide concentration of 1.8 percent, it will be necessary to admix pure argon in order to obtain the desired protective gas. This would require the use of a gas mixer equipped with four inputs.

The present invention enables the use of a cryogenic liquid container which is filled with condensed argon in which at most 0.1 percent by volume nitric oxide is dissolved. Available commercially are transport containers for cryogenic liquids which accommodate a gas quantity corresponding to more than 40 large steel bottles (40 liters) at a pressure of 200 atm. In this case, the large consumer does not require a tank for pure argon, but need only have access to those gases which shall be included in the protective gas. One advantage with the inventive master gas in condensed form is that no gas mixer is required when the protective gas shall only contain argon ill addition to nitric oxide. In other cases a simple, and therewith less expensive gas mixer can be used, since it is no longer necessary to add argon in order to obtain a protective gas of the predetermined composition.

According to the present invention an advantage is afforded when the liquid phase is taken from the argon-nitric oxide mixture in the container and vaporized before use as a protective gas, or admixed with other protective gas constituents. According to another preferred embodiment, both gas and liquid phases are taken from the container, and the latter phase vaporized prior to combining it with the gas phase.

An advantage is also afforded when the cryogenic gas container is a pressure vessel fitted with a pressure valve, such as to prevent the build-up of non-permitted high pressures in the container. The valve should be set to a relatively high pressure, e.g. a pressure of 20 bars. It has also been found that the gas pressure above the liquid in the container should be 3 bars or more, in order to obtain a gas phase of approximately the same composition as the liquid phase. Since the cryogenic gas container is not normally constructed for gas pressures higher than 25 bars, the preferred gas pressure in the container is from 3-25 bars, particularly 5-18 bars. An overpressure valve which opens at a lower pressure than 3 bars is not recommended, since when the master gas is not used, for instance over the weekend, the pressure will quickly rise to 3 bars and all gas formed thereafter and resulting in a higher pressure than 3 bars will be lost to the surroundings.

We claim:

1. A method of producing a protective gas comprising 0.0020–0.100 percent by volume nitric oxide, 0–90 percent by volume helium, 0–5 percent by volume hydrogen, 0–50 percent by volume carbon dioxide, and the remainder argon, characterized by dissolving nitric oxide in condensed argon to a concentration of 0.0010–0.100 percent by volume, calculated on gas phase, vaporizing the resultant solution and admixing remaining constituents in the vaporized solution in such proportions as to obtain a protective gas of predetermined composition.

2. A product for producing a protective gas consisting of 0.0010–0.100 percent by volume nitric oxide, 0–90 percent by volume helium, 0–5 percent by volume hydrogen, 0–50 percent by volume carbon dioxide, and the remainder argon, characterized in that said product consists of liquid argon in which 0.0010–0.100 percent by volume nitric oxide, calculated on gas phase, is dissolved.

3. A product according to claim 2, characterized in that the condensed gas mixture is held under an overpressure.

4. A product according to claim 3, characterized in that the overpressure is 3–25 bars, particularly 7–18 bars.

5. A method for producing a protective gas comprising argon and a predetermined amount of nitric oxide, said predetermined about being between 0.001 and 0.100 volume percent based on the volume of said protective gas, said method comprising dissolving said predetermined amount of nitric oxide in liquid argon and thereafter vaporizing the solution so obtained to form said protective gas.

6. The method of claim 5 wherein said solution is vaporized at a pressure of about 3 to 25 bar.

7. The method of claim 6 wherein said solution is vaporized at a pressure of about 5 to 18 bars.

8. The method of claim 5 wherein said protective gas further comprises a predetermined amount of helium between 0 and 90 percent, a predetermined amount of hydrogen between 0 and 5 percent and a predetermined amount of carbon dioxide between 0 and 50 percent, the percents being based on the volume of said protective gas, said method further comprising admixing said predetermined amounts of helium, hydrogen and carbon monoxide with the vaporized solution of argon and nitrogen oxide to form said protective gas.

9. The method of claim 8 wherein said protective gas contains at least one of helium, hydrogen and carbon monoxide.

10. Liquid argon containing 0.001 to 0.100 mole percent nitric oxide dissolved therein.

11. The liquid argon of claim 10 consisting of argon and nitric oxide.

* * * * *

UNITED STATES PATENT AND TRADEMARK OFFICE
CERTIFICATE OF CORRECTION

PATENT NO. : 5,367,137
DATED : November 22, 1994
INVENTOR(S) : Hammarlund et al.

It is certified that error appears in the above-identified patent and that said Letters Patent is hereby corrected as shown below:

Column 2, line 34, before "and liquid" insert "gas", and

Column 3, line 16, delete "ill" and replace with "in".

Signed and Sealed this

Second Day of May, 1995

BRUCE LEHMAN

Attest:

Attesting Officer

Commissioner of Patents and Trademarks